No. 869,105. PATENTED OCT. 22, 1907.
C. SCHMALZ & K. SCHÄFFER.
MANUFACTURE OF D TOOL HANDLES.
APPLICATION FILED OCT. 23, 1905.

Witnesses:
E. Merkel
C. Zierjacks

Inventors
Christian Schmalz
Karl Schäffer
by William Pataky
attorney

UNITED STATES PATENT OFFICE.

CHRISTIAN SCHMALZ AND KARL SCHÄFFER, OF NORDHAUSEN, GERMANY.

MANUFACTURE OF D TOOL-HANDLES.

No. 869,105.            Specification of Letters Patent.           Patented Oct. 22, 1907.

Application filed October 23, 1905. Serial No. 284,073.

*To all whom it may concern:*

Be it known that we, CHRISTIAN SCHMALZ and KARL SCHÄFFER, both of 54 Kasselerstrasse, Nordhausen, Germany, have invented new and useful Improvements Relating to the Manufacture of the so-called D Tool-Handles, of which the following is a specification.

This invention has reference to improvements relating to the manufacture of the so called D-tool-handles. Heretofore it has only been possible to form these D-grips for tool handles on a commercial scale in several operations. There are several known methods of working, all consisting essentially in forming the D-shaped opening of the grip by a combined boring and stamping process. In all these methods the inner side of the hand grip is left with sharp corners which have to be rounded off in a separate operation.

Our invention consists essentially in forming the D-shaped opening and rounding off the inner side of the hand-grip in a single operation. The method of working is thus technically more perfect and complete, and at the same time more economical.

The method itself consists in that a prepared blank, clamped in a holder or carrier, is rotated once through an angle of 180° in the direction of its longitudinal axis and pressed gradually against a special cutting tool. Said tool cuts simultaneously the D-shaped opening and rounds off the inner side of the hand-grip $a$ in one operation. By this method of working, a D-shaped opening $b$ is formed which, on the side $c$ of said opening opposite the hand-grip, instead of forming a surface whose line runs at an angle or straight relatively to that of the tool handle $a$ as in the known methods of working, forms a concave surface which in its form corresponds to a part of a hollow ball. The production of this form is a characteristic feature of our process or method of working and is a result of the rotation of the tool.

Figure 1:
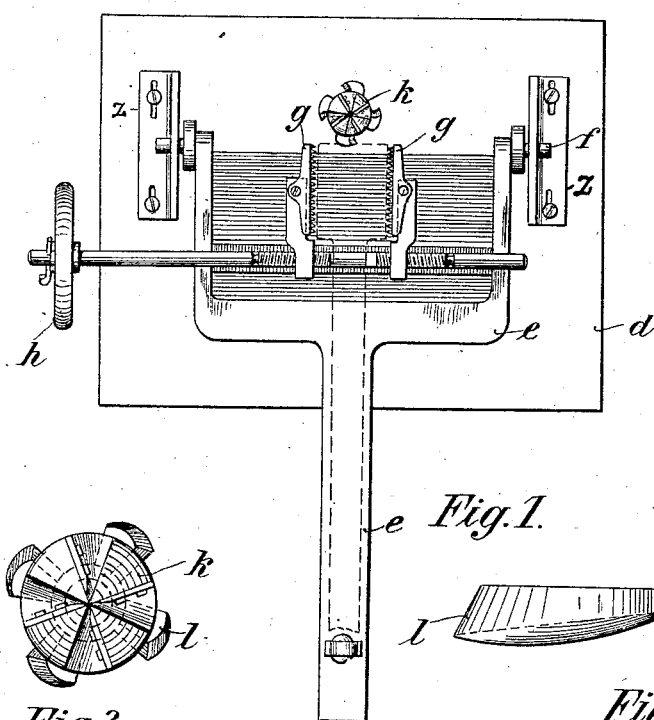
Figure 3:
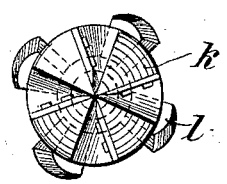
Figure 4:
Figure 2:
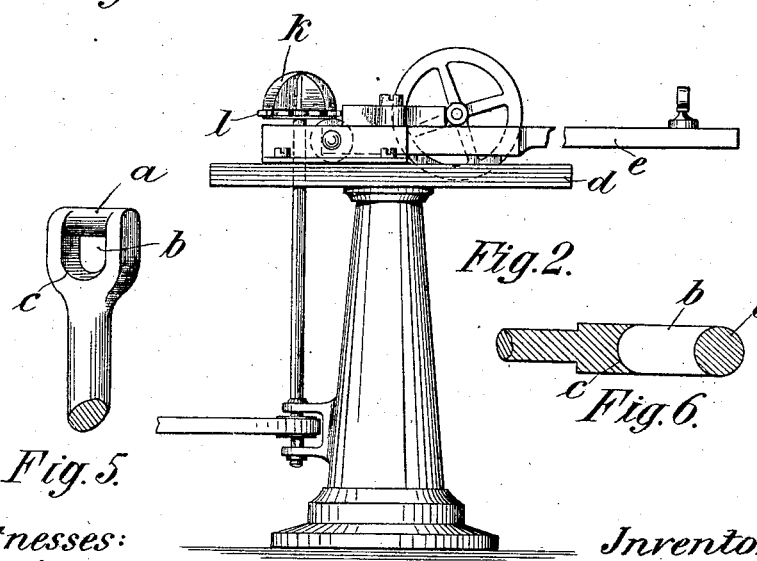
Figures 5, 6:
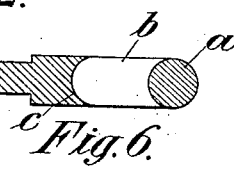

The accompanying drawing illustrates our invention: Figure 1 showing a plan view of the machine for carrying out our process; Fig. 2 a side view of the same; Fig. 3 a plan of the bottom knife of the machine; Fig. 4 a side view of a single cutting tooth of said bottom knife; Fig. 5 a view in perspective of a tool handle made in accordance with our invention; Fig. 6 a longitudinal section of such a tool handle.

The machine for carrying out our process consists of a work-table $d$ on which the support or carrier $e$, which carries the blank and is rotatable on its axis $f$ through an angle of 180°, can be turned over. This carrier is mounted in longitudinally slotted and flanged plates or bearing blocks $z$ attached to the table, and which allows the carrier to be adjusted according to the requirements of different characters of tool handles. Said support $e$ carries as usual two jaws or cheeks $g$ which serve to clamp the blank and which, by means of the hand wheel $h$ at the side, can be simultaneously brought closer together, the spindle of said hand wheel being formed with right and left hand threads. In front of the carrier $e$ the cutting tool or planing-head $k$ is rotated by means of a pulley and belt. This cutting tool consists of two main parts—the compound head $k$ and the bottom knife $l$, the latter being provided because the quadrant-shaped upper knife of the head $k$ would not present its lower, horizontal edge at the right cutting angle, so that an unclean cut would result. Apart from this, the compound cutter has the further advantage that the separate knives can be readily replaced, or taken out for the purpose of sharpening them.

The operation of the machine is as follows: The blank is placed on the support or carrier $e$ and, by simply rotating or turning over said carrier, is gradually pressed against the cutting tool, whereby, in a single operation the hand-grip $a$ is rounded off simultaneously with the cutting out of the opening $b$ and the cavity $c$.

What we claim as our invention and desire to secure by Letters Patent is:—

1. In a machine for making D holes in tool handles, the combination with a horizontally rotating cutter, of a work table or bench $d$, a support or carrier $e$, pivotally mounted thereon, and adapted to be partially rotated on its horizontal axis, clamping jaws $g$, and a horizontal shaft on which said jaws are mounted, said shaft being formed with right and left hand screw threads, engaging with the respective jaws, substantially as described.

2. In a machine for cutting D holes in tool handles, the combination with a horizontally rotating cutting tool, of the work table $d$, the support or carrier $e$ and the slotted, horizontally adjustable bearing blocks to which said carrier is journaled.

3. The method of making D handles for tools, consisting in forming the D-shaped opening and simultaneously rounding the grip by milling such opening progressively from one side of the handle to the other on the arc of a circle whose axis is the center of the grip.

4. A machine for forming D handles comprising a rotary cutter whose longitudinal section is D-shape and means for clamping said handle, so pivoted adjacent the cutter that the work may be swung around an axis corresponding to the center line of the grip part of the desired handle against and completely past the cutter to cut the D-opening and simultaneously round the grip portion.

In testimony whereof we have hereunto set our hands in presence of two subscribing witnesses.

CHRISTIAN SCHMALZ.
                               KARL SCHÄFFER.

Witnesses:
    HENRY HASPER,
    WOLDEMAR HAUPT.